(12) United States Patent
Yoshida et al.

(10) Patent No.: US 6,615,489 B2
(45) Date of Patent: Sep. 9, 2003

(54) METHOD OF MANUFACTURING A FUEL INLET

(75) Inventors: Ryozo Yoshida, Okazaki (JP); Tsuguo Kido, Okazaki (JP); Seiji Yamamoto, Okazaki (JP); Toyohisa Kawabe, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 0 days.

(21) Appl. No.: 10/011,323

(22) Filed: Dec. 3, 2001

(65) Prior Publication Data

US 2002/0100168 A1 Aug. 1, 2002

(30) Foreign Application Priority Data

Dec. 4, 2000 (JP) .......................... 2000-368381

(51) Int. Cl.$^7$ ................................. B23P 15/00
(52) U.S. Cl. ...................... 29/890.14; 29/460
(58) Field of Search ................. 29/890.14, 890.142, 29/890.141, 460, 458; 137/588, 587; 123/516; 220/86.2

(56) References Cited

U.S. PATENT DOCUMENTS

| 4,651,889 | A | * | 3/1987 | Uranishi et al. | ............ 220/86.2 |
| 4,809,865 | A | * | 3/1989 | Mori et al. | ................ 220/86.2 |
| 5,769,057 | A | * | 6/1998 | Hashimoto et al. | ......... 123/516 |
| 6,390,124 | B1 | * | 5/2002 | Kido et al. | ................ 137/588 |
| 6,453,714 | B2 | * | 9/2002 | Kido et al. | .................... 72/297 |

* cited by examiner

*Primary Examiner*—I Cuda Rosenbaum
(74) *Attorney, Agent, or Firm*—Davis & Bujold, P.L.L.C.

(57) ABSTRACT

A method of manufacturing a fuel inlet having an improved anti-rust property. As material for an inlet pipe 2 and a breather tube 4, stainless pipes are used. A pipe expanding process in which an end portion of the inlet pipe 2 is enlarged in diameter to form a filling part 6, a screw-thread forming process in which a helical groove 12 is formed on a periphery of the filling part 6, a welding process in which the breather tube 4 is welded to the inlet pipe 2, and a coating process in which a cationic electrodeposition coating is applied to a fuel inlet 1 after the welding process are performed in turn, thereby obtaining the fuel inlet 1 having an improved anti-rust property.

19 Claims, 4 Drawing Sheets

PRIOR ART

METHOD OF MANUFACTURING A FUEL INLET

FIELD OF THE INVENTION

The present invention relates to a method of manufacturing a fuel inlet for filling fuel, such as gasoline, into a fuel tank of an automobile or the like.

BACKGROUND OF THE INVENTION

Conventionally known as a fuel inlet for filling fuel, such as gasoline, into a fuel tank of an automobile or the like is, for example, a fuel inlet, as shown in FIG. 4, comprising an inlet pipe 102 for conveying fuel into the fuel tank, a filling part 104 formed by expanding an end of the inlet pipe 102, the filling part 104 being provided with a helical groove 104b for engagement with a cap (not shown), and a breather tube 110 for venting air from the fuel tank when the fuel tank is filled with fuel, the breather tube 110 opening into the inlet pipe 102 in the vicinity of the end thereof.

In the case of such a fuel inlet, for the purpose of rust proofing, galvanized steel pipes are used for the inlet pipe 102 and the breather tube 110, and furthermore, any coating is applied thereto.

In recent years, however, the influence of materials used in automobiles upon the global environment has become a major concern for more and more people, and regulations on use of such materials have been made tighter. Also, a further improvement of components of a fuel system is desired in view of their durability. Furthermore, a further improvement is also required in view of their anti-rust property.

SUMMARY OF THE INVENTION

The present invention was made to meet the aforementioned requirements. More particularly, the object of the invention is to provide a method of manufacturing a fuel inlet having an improved anti-rust property.

In order to attain this object, there is provided a method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising:

a preparatory process in which stainless pipes for manufacturing the inlet pipe and the breather tube are prepared, a pipe expanding process in which an end portion of the inlet pipe is enlarged in diameter to form a filling part, a screw-thread forming process in which a helical groove is formed on a periphery of the filling part, a welding process in which the breather tube is welded to the inlet pipe, and a coating process in which a cationic electrodeposition coating is applied to the fuel inlet.

As material for the stainless pipes, SUS436 is preferably used. Also, in the welding process, an open end of the breather tube may be joined to a periphery of the inlet pipe by means of projection welding. Furthermore, in the screw-thread forming process, a core bar on which a groove is formed is inserted into the filling part, and a roller is moved along the groove, while being pressed against the periphery of the filling part, thereby forming the helical groove.

BRIEF DESCRIPTION OF THE DRAWINGS

The present invention will now be described more in detail, by way of example, with reference to the accompanying drawings, in which.

DESCRIPTION OF THE PREFERRED EMBODIMENTS

Figure 1:
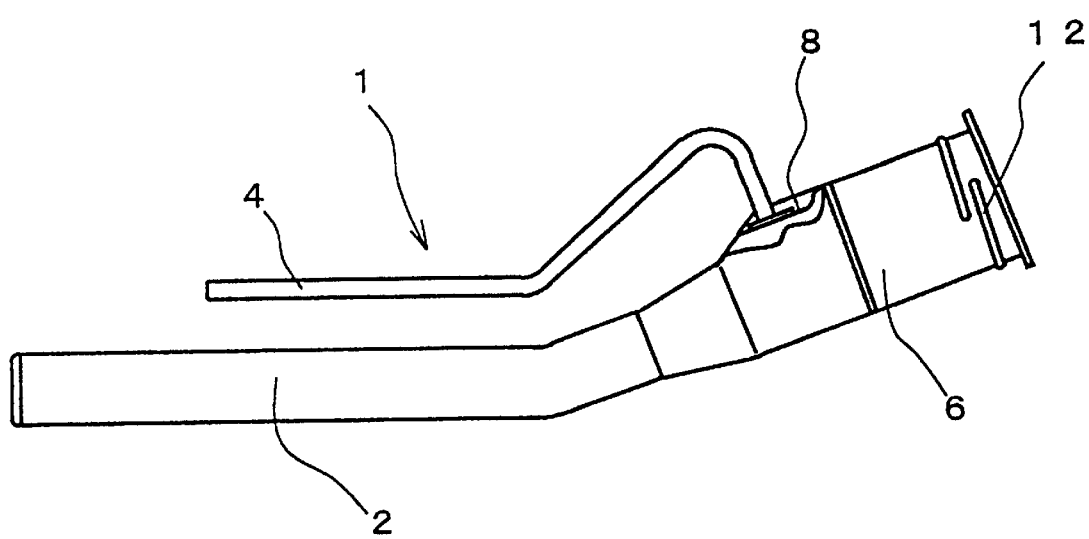
FIG. 1 is a front view of a fuel inlet manufactured by a method according to an embodiment of the present invention.

As shown in FIG. 1, a fuel inlet 1 comprises an inlet pipe 2 and a breather tube 4. The inlet pipe 2 is a cylindrical pipe for conveying fuel into a fuel tank, and an end portion of the inlet pipe 2 is enlarged in diameter to form a filling part 6.

Figure 3:
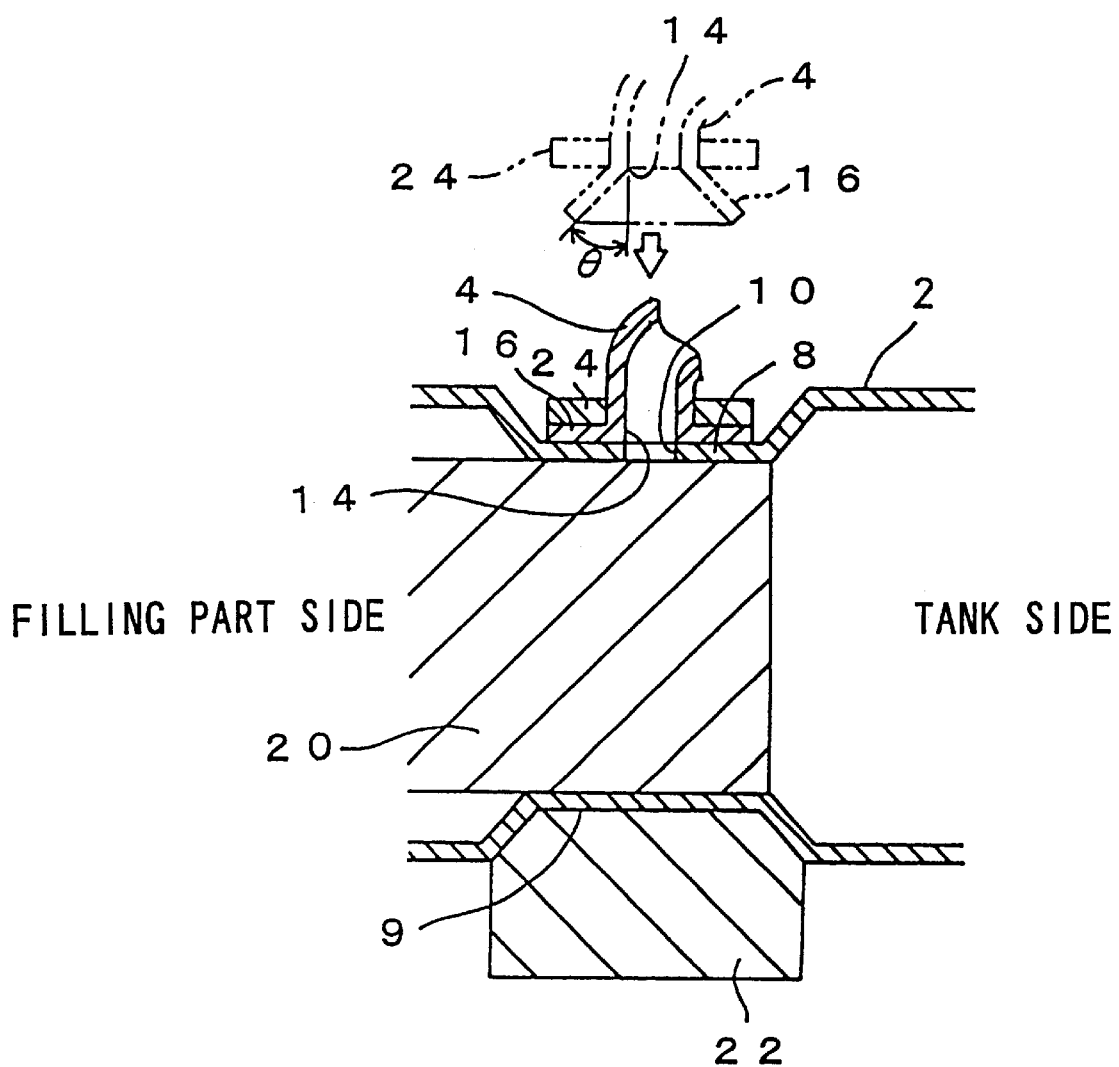
FIG. 3 is an explanatory view of a projection welding process according to the embodiment.
Figure 4:
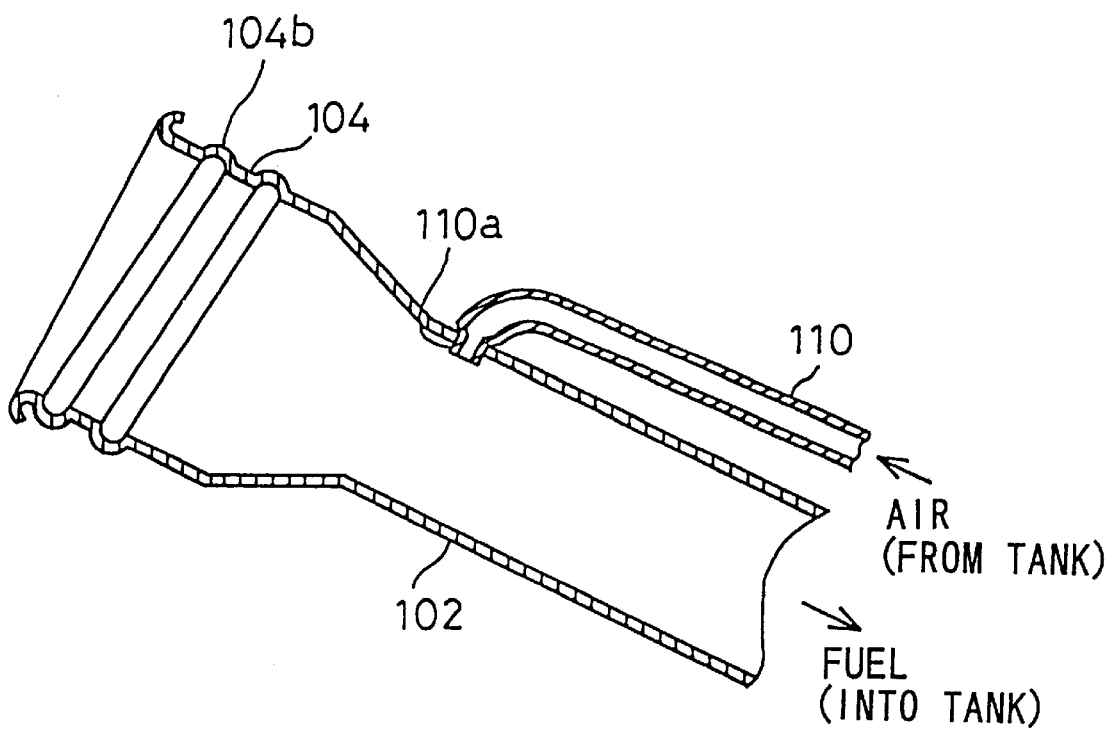
FIG. 4 is a sectional view of a substantial part of a conventional fuel inlet.

Also, as shown in FIG. 3, the inlet pipe 2 has a flat portion 8 formed for attachment of the breather tube 4 thereto, the flat portion 8 having a through hole 10 opening into the breather tube 4. A helical groove 12 is provided on a periphery of the filling part 6 for engagement with a cap (not shown). The breather tube 4 is provided with a flange 16 at an open end 14 thereof, the flange 16 being connected to the flat portion 8 of the inlet pipe 2 by means of projection welding.

By affixing the fuel inlet 1 having the aforementioned composition to a fuel tank of an automobile, when a filling nozzle (not shown) is inserted into the filling part 6 to fill gasoline into the fuel tank, air within the fuel tank is vented through the breather tube 4. In this manner, transfer of gasoline can be made smoothly, while mixing of air bubbles into gasoline within the fuel tank can be prevented.

The inlet pipe 2 and the breather tube 4 are made of stainless pipes; more particularly, in this embodiment, stainless pipes of SUS436 are used for the inlet pipe 2 and the breather tube 4.

The inlet pipe 2 is first bent, in a bending process, to be in a dogleg shape as shown in FIG. 1. Subsequently, in a cutting process, the inlet pipe 2 is cut with a predetermined length. Next, in a pipe-expanding process, an expander punch (not shown) is inserted from an open end of the inlet pipe 2, thereby expanding an end portion of the inlet pipe 2 to form the filling part 6. In this embodiment, the filling part 6 is formed in an eccentric manner relative to the other portion of the inlet pipe 2. Furthermore, a flaring process is performed, thereby outwardly folding back the open end of the inlet pipe 2. For example, in cases where the filling part 6 is joined to the inlet pipe 2 by means of brazing or the like, a broad heat-affected zone is generated. As a result, the anti-rust property in this zone is remarkably deteriorated. On the other hand, by forming the filling part 6 by means of pipe expansion, such a heat-affected zone can be eliminated, and moreover, the cost of manufacture can be reduced.

Figure 2:
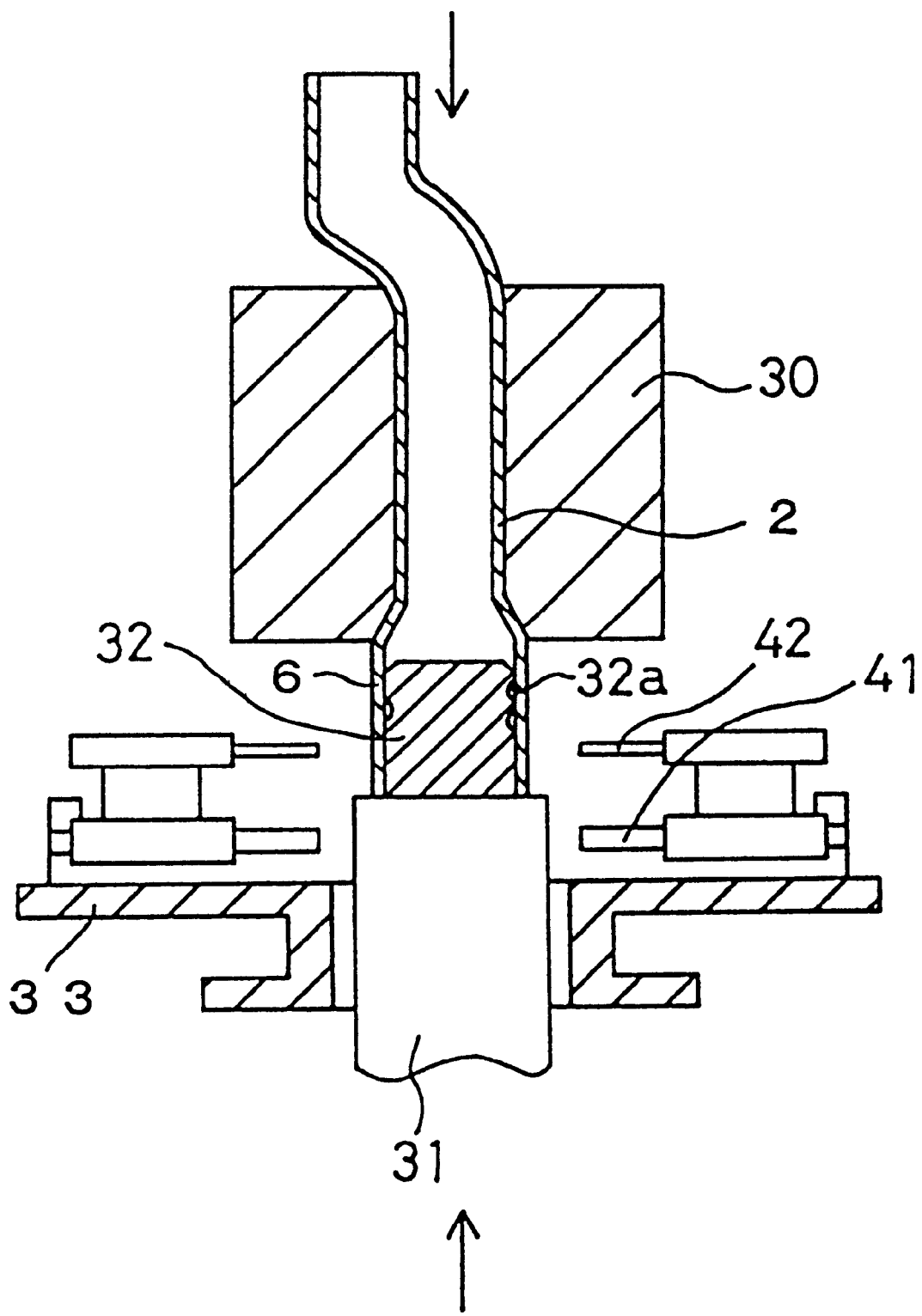
FIG. 2 is an explanatory view of a screw-thread forming process according to the embodiment.

Subsequently, in a screw-thread forming process, a periphery of the inlet pipe 2 is securely held by a hydraulic clamp 30, as shown in FIG. 2. Then, a core bar 32 fixed to a pipe end processing die 31 is inserted into the filling part 6 of the inlet pipe 2. On the core bar 32, irregularities 32a are provided to form the helical groove 12. The helical groove 12 is formed in such a shape that the cap (not shown) can be engaged therewith.

In this state, a rough roller 41 and a fine roller 42, both disposed on a rotator 33 which is rotatable about the inlet pipe 2 in its axial direction, are pressed against a peripheral surface of the filling part 6 of the inlet pipe 2. The rough roller 41 has a large roller width, and the fine roller 42 has a small roller width.

Both of the rough roller 41 and the fine roller 42 are movable in a radial direction of the rotator 33 by means of a hydraulic cylinder. Also, vertical positions of the rough roller 41 and the fine roller 42 can be interchanged. The rough roller 41 serves for roughly shaping the filling part 6 of the inlet pipe 2, and the fine roller 42 serves for exactly conforming the shape of the filling part 6 of the inlet pipe 2, which has been roughly shaped by means of the rough roller 41, with the shape of the core bar 32. Use of two rollers, that is, the rough roller 41 and the fine roller 42, makes it possible to process the filling part 6 of the inlet pipe 2 in conformity with the shape of the core bar 32 with an advanced accuracy, compared to the case of use of only one kind of rotating roller.

In the screw-thread forming, the rough roller 41 is first shifted in the radial direction by means of the hydraulic cylinder, and is pressed against the periphery of the filling part 6, while the rotator 33 is rotated about an axis of the inlet pipe 2 as well as gradually shifted downward. As a result, the rough roller 41 is gradually shifted downward from an end region of the core bar 32. Then, when it reaches the neighborhood of the open end of the inlet pipe 2, the filling part 6 of the inlet pipe 2 has been roughly shaped in conformity with the shape of the irregularities 32a of the core bar 32.

In the same manner, the fine roller 42 is subsequently shifted in the radial direction by means of the hydraulic cylinder, and is pressed against the periphery of the filling part 6, while the rotator 33 is rotated about the axis of the inlet pipe 2 as well as gradually shifted downward. As a result, the filling part 6 of the inlet pipe 2 is finely shaped in conformity with the shape of the irregularities 32a of the core bar 32. Then, the rotation of the rotator 33 is stopped, the fine roller 42 is outwardly shifted back in the radial direction by means of the hydraulic cylinder, and the inlet pipe 2 is released from holding by means of the hydraulic clamp 30. The process of forming the helical groove 12 on the periphery of the filling part 6 of the inlet pipe 2 is thus ended.

Next, in a seat forming process, press working is performed to form the flat portion 8 of the inlet pipe 2. At the same time, a supporting flat portion 9 may also be formed on the side opposite to the flat portion 8, such that the inlet pipe 2 can be more easily supported at the time of performing projection welding.

Subsequently, in a welding process, an electrode 20 having a substantially rectangular shape is inserted from the filling part 6 of the inlet pipe 2. At this time, arrangement is made in such a manner that the electrode 20 comes in contact with an entire inside face of the flat portion 8. Also, the supporting flat portion 9 of the inlet pipe 2 is abutted on a supporting table 22, thereby preventing the inlet pipe 2 from rotating or overturning. Furthermore, a ring-shaped electrode 24 has the breather tube 4 inserted thereinto and is placed on an upper side of the flange 16 of the breather tube 4. The inside diameter of the electrode 24 is substantially equal to the outside diameter of the breather tube 4.

In the aforementioned state, the ring-shaped electrode 24 and the electrode 20 inserted into the inlet pipe 2 are faced to each other, and the electrode 24 is shifted downward (as shown by a white arrow in FIG. 3) such that an open end portion of the flange 16 of the breather tube 4 comes into contact with the flat portion 8 of the inlet pipe 2 Then, the ring-shaped electrode 24 is pressed against the electrode 20, while current is applied between the electrodes 20 and 24. As a result, the end portion of the flange 16 is welded to the flat portion 8 by means of resistance heat. At the same time, the flange 16 is gradually expanded by pressurization, and the expanded portion of the flange 16 is further welded to the flat portion 8. In this manner, the flange 16 is finally welded to the flat portion 8 in its entirety. In cases where the breather tube 4 is joined to the inlet pipe 2 by means of brazing, there is a large heat-affected zone generated. On the other hand, by joining the two by means of projection welding, generation of a heat-affected zone can be reduced, thereby achieving an improvement in the anti-rust property.

Next, in a coating process, a cationic electrodeposition coating is applied to the fuel inlet 1. In this process following the welding process, the fuel inlet 1 is first washed with hot water and, subsequently, oil adhered to the surfaces of the fuel inlet 1 is removed. Then, the fuel inlet 1 is washed with water.

Subsequently, the fuel inlet 1 is immersed in a coating liquid. The fuel inlet 1 is then subjected to a negative voltage, while a positive voltage is applied to an electrode in the coating liquid, thereby forming a coating film on the fuel inlet 1 by means of an electrochemical reaction. As an electrodeposition coating material, for example, an acrylic coating, an alkyd coating, a urethane coating, an epoxy coating, or the like may be used, and these coatings are provided in the form of a cationic aqueous solution or emulsion.

After application of the electrodeposition coating, the fuel inlet 1 is washed with water, and then dried by baking. Differently from the case where a cationic electrodeposition coating is applied to iron, in the case where a cationic electrodeposition coating is applied to a stainless material, the processes of surface conditioning, chemical conversion coating, chrome rinsing and the like can be skipped, and the entire coating process can thus be simplified. However, even if the aforementioned processes (including surface conditioning and others) are performed, coating effect is not deteriorated at all.

Now, an anti-rust property test to check the anti-rust property of the fuel inlet 1 manufactured through the aforementioned processes is described. For a composite anti-rust property evaluation, salt spray, drying by heating, wetting, and drying at room temperature were performed in turn, regarding this series of processing as one cycle, the one cycle being completed in 24 hours. This cycle was repeatedly conducted 180 times, and in view of the results thereof, the anti-rust property of the fuel inlet 1 was evaluated by means of comparative evaluation.

The results of this anti-rust property test are shown in Table 1. A comparative product A was made of iron having a cationic electrodeposition coating applied thereto, and a comparative product B was made of a stainless material (SUS436) without any coating applied thereto.

In respect of the comparative product A, the breather tube 4 was bent and damaged, or pierced with a hole. Also, the projection welding portion thereof was rusted. Furthermore, an end portion of the fuel inlet 1 was also rusted, and leakage occurred when pressure was applied to the fuel inlet 1 for testing of leakage.

As to the comparative product B, the inlet pipe 2 and the breather tube 4 were pitted by corrosion, with a hole 0.4 mm in depth and a hole 0.3 mm in depth, respectively. On the contrary, a product according to this embodiment was not pierced with a hole, not pitted by corrosion, nor rusted, which proved an extremely high anti-rust property of the fuel inlet 1 of the invention.

The invention is, of course, not restricted to the embodiment described above, and may be practiced or embodied in still other ways without departing from the subject matter thereof.

As mentioned above, by adopting a manufacturing method of the invention, provision of a fuel inlet having an improved anti-rust property can be realized.

TABLE 1

| | | NO. | Appearance General Parts | Appearance Ring Projection Portions | Appearance End Portions | Pressure Test 0.5 kg/cm² | Comprehensive Evaluation |
|---|---|---|---|---|---|---|---|
| Comparative Product A | Iron + Cationic Electrodeposition | ① | Tube bent and damaged | Rusted | Rusted | X | X |
| | | ② | Tube pierced with a hole | Rusted | Rusted | X | X |
| Comparative Product B | SUS436 | ① | Pipe pitted by corrosion with a hole 0.4 mm in depth; Tube pitted by corrosion with a hole 0.3 mm in depth | | | ○ | Δ |
| | | ② | Pipe pitted by corrosion with a hole 0.4 mm in depth; Tube pitted by corrosion with a hole 0.3 mm in depth | | | ○ | Δ |
| Product of Invention | SUS436 + Cationic Electrodeposition | ① | Unchanged | Rusted | Unchanged | ○ | ◎ |
| | | ② | Unchanged | Rusted | Unchanged | ○ | ◎ |

What is claimed is:

1. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:
   providing a first stainless pipe for manufacturing the inlet pipe and a second stainless pipe for forming the breather tube;
   expanding an end portion of the inlet pipe to form a filling part having a larger diameter than a remainder of the inlet pipe;
   forming a helical groove on a peripheral wall of the filling part to produce a screw-thread in the filling part;
   welding the breather tube to the inlet pipe; and
   applying a cationic electrodeposition coating to the fuel inlet.

2. The method of manufacturing a fuel inlet according to claim 1, further comprising the step of providing the first and second stainless pipes made of a stainless material SUS436.

3. The method of manufacturing a fuel inlet according to claim 1, further comprising the step of welding an open attachment end of the breather tube to a peripheral wall of the inlet pipe by means of projection welding.

4. The method of manufacturing a fuel inlet according to claim 1, further comprising the step of forming the helical groove by inserting a core bar on which a groove is formed into the filling part, and a roller is moved along the groove, while being pressed against the peripheral wall of the filling part, thereby forming the helical groove.

5. The method of manufacturing a fuel inlet according to claim 1, further comprising the step of forming the larger diameter of the filling part offset from a diameter of the remainder of the pipe during the pipe expanding step.

6. The method of manufacturing a fuel inlet according to claim 5, further comprising the step of flaring an edge portion of the filling part of the inlet pipe to fold back an open end of the filling part of the fuel inlet.

7. The method of manufacturing a fuel inlet according to claim 3, further comprising the step of forming a seat as a first flat portion in the peripheral wall of the inlet pipe 2 by press working a portion of the inlet pipe.

8. The method of manufacturing a fuel inlet according to claim 7, further comprising the step of forming a second flat portion in the peripheral wall on an opposite side of the inlet pipe to that of the seat in order that the inlet pipe can be easily supported for projection welding of the breather tube in the seat.

9. The method of manufacturing a fuel inlet according to claim 8, further comprising the steps of inserting a substantially rectangular shaped electrode inside the inlet pipe to contact the first and second flat portions of the seat formed therein and positioning a second electrode circumscribing the open attachment end of the breather tube on an outer side of the flat portion of the seat and applying current between the electrodes to weld the breather tube to the seat.

10. The method of manufacturing a fuel inlet according to claim 4, further comprising the steps of providing a rough and a fine roller wherein the rough roller is initially moved along the groove and subsequently followed by the fine roller being moved along the groove to form the helical groove in the peripheral wall of the filling part.

11. The method of manufacturing a fuel inlet according to claim 10, further comprising the steps of supporting the rough and fine rollers on a rotator and circumferentially rotating the rotator about the inlet pipe which is held in a substantially fixed position with respect to the rotator.

12. The method of manufacturing a fuel inlet according to claim 11, further comprising the step of also providing the rotator with an axial movement substantially along a longitudinal axis defined by the inlet pipe and radially moving the rough and fine rollers to press against the peripheral wall of the inlet pipe to form the helical groove in the filling part of the inlet pipe.

13. The method of manufacturing a fuel inlet according to claim 1, further comprising the step of electrodepositing a coating material chosen from the group of an acrylic coating, an alkyd coating, a urethane coating, and an epoxy coating, all of which are provided in the form of one of a cationic aqueous solution and an emulsion.

14. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:

providing a first stainless pipe for manufacturing the inlet pipe and a second stainless pipe for forming the breather tube;

expanding an open end of the inlet pipe to form a filling part having a larger diameter than a remainder of the inlet pipe and forming the larger diameter of the filling part offset from a diameter of the remainder of the pipe;

flaring an edge of the filling part to fold back the open end of the filling part of the fuel inlet;

forming a helical groove on an outer surface of a peripheral wall of the filling part to produce a screw-thread on an inner surface of the peripheral wall of the filling part;

welding the breather tube to the inlet pipe; and applying a cationic electrodeposition coating to the fuel inlet.

15. The method of manufacturing a fuel inlet according to claim 14, further comprising the step of forming the helical groove by inserting a core bar on which a groove is formed into the filling part, and at least a first roller is pressed against the outer peripheral surface of the filling part and follows along the groove of the core bar thereby forming the helical groove in the filling part.

16. The method of manufacturing a fuel inlet according to claim 15, further comprising the steps of providing a rough and a fine roller wherein the rough roller is initially moved along the groove and subsequently followed by the fine roller being moved along the groove to form the helical groove in the peripheral wall of the filling part.

17. The method of manufacturing a fuel inlet according to claim 16, further comprising the steps of supporting the rough and fine rollers on a rotator and circumferentially rotating the rotator about the inlet pipe which is held in a substantially fixed position with respect to the rotator.

18. The method of manufacturing a fuel inlet according to claim 17, further comprising the step of also providing the rotator with an axial movement substantially along a longitudinal axis defined by the inlet pipe and radially moving the rough and fine rollers to press against the peripheral wall of the inlet pipe to form the helical groove in the filling part of the inlet pipe.

19. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:

providing a first stainless pipe for manufacturing the inlet pipe and a second stainless pipe for forming the breather tube;

expanding an open end of the inlet pipe to form a filling part having a larger diameter than a remainder of the inlet pipe and forming the larger diameter of the filling part offset from a diameter of the remainder of the pipe;

flaring an edge of the filling part to fold back the open end of the filling part of the fuel inlet;

forming a helical groove on an outer surface of the peripheral wall of the filling part to produce a screw-thread on an inner surface of the peripheral wall of the filling part by inserting a core bar on which a groove is formed into the filling part, and a rough and a fine roller are sequentially pressed against the outer surface of the peripheral wall and follow along the groove of the core bar thereby forming the helical groove in the peripheral wall of the filling part, welding the breather tube to the inlet pipe; and applying a cationic electrodeposition coating to the fuel inlet.

\* \* \* \* \*

EX PARTE REEXAMINATION CERTIFICATE (5938th)
United States Patent
Yoshida et al.

(10) Number: US 6,615,489 C1
(45) Certificate Issued: Oct. 9, 2007

(54) METHOD OF MANUFACTURING A FUEL INLET

(75) Inventors: Ryozo Yoshida, Okazaki (JP); Tsuguo Kido, Okazaki (JP); Seiji Yamamoto, Okazaki (JP); Toyohisa Kawabe, Okazaki (JP)

(73) Assignee: Futaba Industrial Co., Ltd., Hashime-Cho, Okazaki-Shi, Aichi-Ken (JP)

Reexamination Request:
No. 90/007,311, Nov. 18, 2004

Reexamination Certificate for:
Patent No.: 6,615,489
Issued: Sep. 9, 2003
Appl. No.: 10/011,323
Filed: Dec. 3, 2001

(30) Foreign Application Priority Data

Dec. 4, 2000 (JP) ............................ 2000-368381

(51) Int. Cl.
*B23P 15/00* (2006.01)

(52) U.S. Cl. ........................ 29/890.14; 29/460
(58) Field of Classification Search .............. 29/460, 29/890.14; 220/86.2
See application file for complete search history.

(56) References Cited

FOREIGN PATENT DOCUMENTS

| JP | 56-21221 | 2/1981 |
|----|----------|--------|
| JP | 6-116519 | 4/1994 |
| JP | 9-150637 | 6/1997 |
| JP | 9-240294 | 9/1997 |
| JP | 9-249036 | 9/1997 |
| JP | 10-43674 | 2/1998 |
| JP | 10-119595 | 5/1998 |

OTHER PUBLICATIONS

Stainless Steel Handbook $3^{rd}$ Edition, issued Jan. 24, 1995 (pp. 1264–1271) with Translation Edited by Japan Stainless Steel Association Published by The Daily Engineering & Construction News.

*Primary Examiner*—Jimmy G. Foster

(57) ABSTRACT

A method of manufacturing a fuel inlet having an improved anti-rust property. As material for an inlet pipe 2 and a breather tube 4, stainless pipes are used. A pipe expanding process in which an end portion of the inlet pipe 2 is enlarged in diameter to form a filling part 6, a screw-thread forming process in which a helical groove 12 is formed on a periphery of the filling part 6, a welding process in which the breather tube 4 is welded to the inlet pipe 2, and a coating process in which a cationic electrodeposition coating is applied to a fuel inlet 1 after the welding process are performed in turn, thereby obtaining the fuel inlet 1 having an improved anti-rust property.

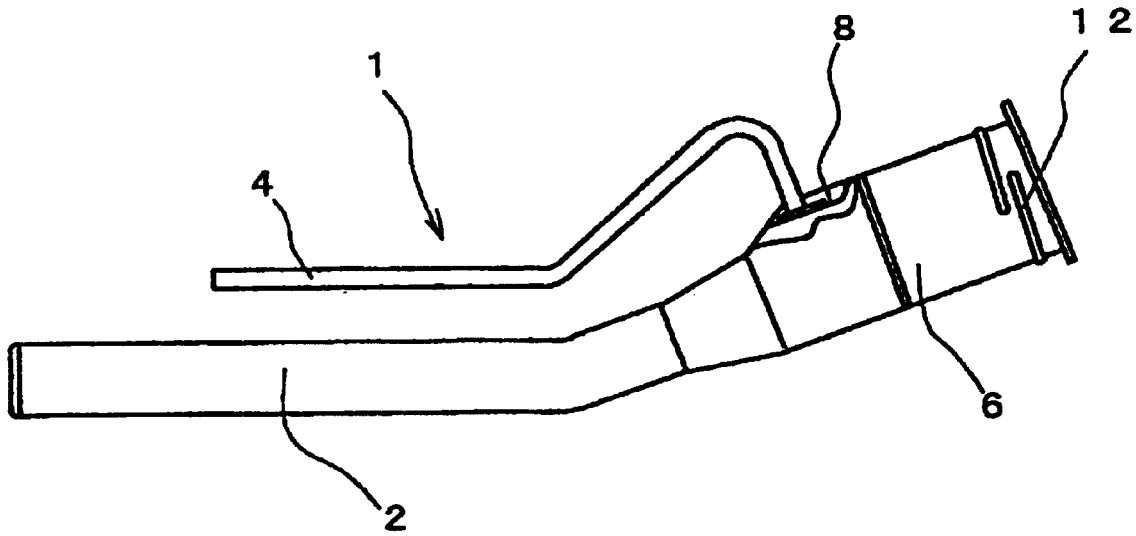

US 6,615,489 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 56–62:

As material for the stainless pipes, SUS436 is preferably used. Also, in the welding process, an open end of the breather tube may be joined to a periphery of the inlet pipe by means of projection welding. *SUS436 is generally in the range of 0–0.025% C, 0–1.00% Mn, 0–0.040% P, 0–0.030% S, 0–1.00% Si, 16.00–19.00% Cr, 0–0.60% Ni, 0.75–1.50% Mo, 0–0.025% N and at least one of Ti, Nb and Zr within the range of 8\*(C %+N %)–0.80% with the balance being Fe (iron).* Furthermore, in the screw-thread forming process, a core bar on which a groove is formed is inserted into the filling part, and a roller is moved along the groove, while being pressed against the periphery of the filling part, thereby forming the helical groove.

AS A RESULT OF REEXAMINATION, IT HAS BEEN DETERMINED THAT:

Claim 2 is cancelled.

Claims 1, 14 and 19 are determined to be patentable as amended.

Claims 3–13 and 15–18, dependent on an amended claim, are determined to be patentable.

New claims 20–30 are added and determined to be patentable.

1. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:
   providing a first stainless pipe for manufacturing the inlet pipe *from a SUS436 stainless material* and a second stainless pipe for forming the breather tube *from a SUS436 stainless material where the composition of SUS436 stainless material is generally in the ranges of 0–0.025% C, 0–1.00% Mn, 0–0.040% P, 0–0.030% S, 0–1.00% Si, 16.00–19.00% Cr, 0–0.60% Ni, 0.75–1.50% Mo, 0–0.025% N and at least one of Ti, Nb and Zr within the range of 8\*(C %+N %)–0.80% with the balance being Fe (iron)*
   expanding an end portion of the inlet pipe to form a filling part having a larger diameter than a remainder of the inlet pipe;
   forming a helical groove on a peripheral wall of the filling part to produce a screw-thread in the filling part;
   welding the breather tube to the inlet pipe; and
   applying a cationic electrodeposition coating to the fuel inlet.

14. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:
    providing a first stainless pipe for manufacturing the inlet pipe *from a SUS436 stainless material* and a second stainless pipe for forming the breather tube *from a SUS436 stainless material where the composition of SUS436 stainless material is generally in the ranges of 0–0.025% C, 0–1.00% Mn, 0–0.040% P, 0–0.030% S, 0–1.00% Si, 16.00–19.00% Cr, 0–0.60% Ni, 0.75–1.50% Mo, 0–0.025% N and at least one of Ti, Nb and Zr within the range of 8\*(C %+N %)–0.80% with the balance being Fe (iron);*
    expanding an open end of the inlet pipe to form a filling part having a larger diameter than a remainder of the inlet pipe and forming the larger diameter of the filling part offset from a diameter of the remainder of the pipe;
    flaring an edge of the filling part to fold back the open end of the filling part of the fuel inlet;
    forming a helical groove on an outer surface of a peripheral wall of the filling part to produce a screw-thread on an inner surface of the peripheral wall of the filling part;
    welding the breather tube to the inlet pipe; and
    applying a cationic electrodeposition coating to the fuel inlet.

19. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:
    providing a first stainless pipe for manufacturing the inlet pipe *from a SUS436 stainless material* and a second stainless pipe for forming the breather tube *from a SUS436 stainless material where the composition of SUS436 stainless material is generally in the ranges of 0–0.025% C, 0–1.00% Mn, 0–0.040% P, 0–0.030% S, 0–1.00% Si, 16.00–19.00% Cr, 0–0.60% Ni, 0.75–1.50% Mo, 0–0.025% N and at least one of Ti, Nb and Zr within the range of 8\*(C %+N %)–0.80% with the balance being Fe (iron);*
    expanding an open end of the inlet pipe to form a filling part having a larger diameter than a remainder of the inlet pipe and forming the larger diameter of the filling part offset from a diameter of the remainder of the pipe;
    flaring an edge of the filling part to fold back the open end of the filling part of the fuel inlet;
    forming a helical groove on an outer surface of the peripheral wall of the filling part to produce a screw-thread on an inner surface of the peripheral wall of the filling part by inserting a core bar on which a groove is formed into the filling part, and a rough and a fine roller are sequentially pressed against the outer surface of the peripheral wall and follow along the groove of the core bar thereby forming the helical groove in the peripheral wall of the filling part;
    welding the breather tube to the inlet pipe; and
    applying a cationic electrodeposition coating to the fuel inlet.

*20. The method of manufacturing a fuel inlet according to claim 1, further comprising the step of washing the fuel inlet prior to the step of applying the cationic electrodeposition coating.*

21. The method of manufacturing a fuel inlet according to claim 20, further comprising the steps of washing the fuel inlet and drying the fuel inlet by baking subsequent to the step of applying the cationic electrodeposition coating.

22. The method of manufacturing a fuel inlet according to claim 1, wherein the method omits the steps of surface conditioning, chemical conversion coating and chrome rinsing in order to simplify the entire coating process.

23. The method of manufacturing a fuel inlet according to claim 14, further comprising the step of washing the fuel inlet prior to the step of applying the cationic electrodeposition coating.

24. The method of manufacturing a fuel inlet according to claim 23, further comprising the steps of washing the fuel inlet and drying the fuel inlet by baking subsequent to the step of applying the cationic electrodeposition coating.

25. The method of manufacturing a fuel inlet according to claim 14, wherein the method omits the steps of surface conditioning, chemical conversion coating and chrome rinsing in order to simplify the entire coating process.

26. The method of manufacturing a fuel inlet according to claim 19, further comprising the step of washing the fuel inlet prior to the step of applying the cationic electrodeposition coating.

27. The method of manufacturing a fuel inlet according to claim 26, further comprising the steps of washing the fuel inlet and drying the fuel inlet by baking subsequent to the step of applying the cationic electrodeposition coating.

28. The method of manufacturing a fuel inlet according to claim 19, wherein the method omits the steps of surface conditioning, chemical conversion coating and chrome rinsing in order to simplify the entire coating process.

29. A method of manufacturing a fuel inlet, the fuel inlet comprising an inlet pipe for conveying fuel into a fuel tank and a breather tube for venting air from the fuel tank toward an end of the inlet pipe when the fuel is filled into the fuel tank, the method comprising the steps of:

providing a first SUS436 stainless steel pipe for manufacturing the inlet pipe and a second SUS436 stainless steel pipe for forming the breather tube where the composition of SUS436 stainless material is generally in the ranges of 0–0.025%C, 0–1.00% Mn, 0–0.040% P, 0–0.030% S, 0–1.00% Si, 16.00–19.00% Cr, 0–0.60% Ni, 0.75–1.50% Mo, 0–0.025% N and at least one of Ti, Nb and Zr within the range of 8*(C %+N %)–0.80% with the balance being Fe (iron);

expanding an end portion of the inlet pipe to form a filling part having a larger diameter than a remainder of the inlet pipe;

forming a helical groove on a peripheral wall of the filling part to produce a screw-thread in the filling part;

welding the breather tube to the inlet pipe;

washing the fuel inlet;

applying a cationic electrodeposition coating to the fuel inlet;

washing the fuel inlet and drying the fuel inlet by baking; and wherein the method omits the steps of surface conditioning, chemical conversion coating and chrome rinsing.

30. A method of manufacturing a fuel inlet, the fuel inlet comprising an inlet pipe for conveying fuel into a fuel tank and a breather tube for venting air from the fuel tank toward an end of the inlet pipe when the fuel tank is filled with fuel, the method comprising the steps of:

providing a first stainless pipe for manufacturing the inlet pipe from a SUS436 stainless material and a second stainless pipe for forming the breather tube from a SUS436 stainless material where the composition of SUS436 stainless material is generally in the ranges of 0–0.025% C, 0–1.00% Mn, 0–0.040% P, 0–0.030% S, 0–1.00% Si, 16.00–19.00% Cr, 0–0.60% Ni, 0.75–1.50% Mo, 0–0.025% N and at least one of Ti, Nb and Zr within the range of 8*(C %+N %)–0.80% with the balance being Fe (iron);

expanding an end portion of the inlet pipe to form a filling part having a larger diameter and offset from a diameter of the remainder of the pipe;

forming a helical groove on a peripheral wall of the filling part to produce a screw-thread in the filling part by inserting a core bar on which a groove is formed into the filling part, and a rough and a fine roller are moved along the groove, while being pressed against the peripheral wall of the filling part, wherein the rough roller is initially moved along the groove and subsequently followed by the fine roller being moved along the groove to form the helical groove in the peripheral wall of the filling part;

welding an open attachment end of the breather tube to a peripheral wall of the inlet pipe by means of projection welding; and applying a cationic electrodeposition coating to the fuel inlet.

\* \* \* \* \*